United States Patent Office 3,782,970
Patented Jan. 1, 1974

3,782,970
PROCESS FOR PRODUCING EMULSIFIED FATS
Tsutomu Tomita, Yachiyo, and Masahiko Mizukoshi, Funabashi, Japan, assignors to Kao Soap Co., Ltd., Tokyo, Japan
No Drawing. Filed Aug. 27, 1971, Ser. No. 175,769
Claims priority, application Japan, Sept. 2, 1970, 45/76,959
Int. Cl. A23d 5/00
U.S. Cl. 426—363      7 Claims

ABSTRACT OF THE DISCLOSURE

An emulsified fat composition, useful for baking, is prepared from (1) a first homogeneous solution containing edible oil or fat, (2) a second homogeneous solution containing sucrose fatty acid ester, polyglycerol fatty acid ester or polyoxyethylene sorbitan fatty acid ester, and (3) aqueous sorbitol solution, aqueous invert sugar solution, corn syrup or honey. The composition is prepared by either (A) dissolving (1) into (2) and then mixing with (3), or (B) dissolving (2) into (3) and then mixing with (1), and then quickly cooling and kneading the emulsion.

BACKGROUND OF THE INVENTION

Field of the invention

This invention relates to a process for producing emulsified fats suitable for use as an ingredient in making sponge cakes.

Description of the prior art

Conventional oil-in-water emulsified fats comprise 50–85 parts by weight of an edible fat or oil and a total of 50–15 parts by weight of water and an emulsifier. The conventional emulsified fats have been prepared mainly from the above ingredients by simply allowing the mixed emulsified systems to cool at room temperature to obtain emulsified fats. Consequently, they are deficient in that the foaming property thereof is poor and, accordingly, the volume of baked sponge cake made therefrom is low and that the emulsified fats are subject to microorganism growth during storage.

The objects of this invention are to overcome these defects of conventional oil-in-water emulsified fats and to provide a process for preparing improved emulsified fats suitable as an ingredient for making excellent sponge cakes of a higher quality than has been obtained with conventional emulsified fats.

SUMMARY OF THE INVENTION

The process of the present invention comprises the steps of:

(a) Heating a mixture of 20–45 parts by weight of an edible oil or fat, 0.1–1 part by weight of lecithin, 2–10 parts by weight of a glycerol fatty acid ester, 2–10 parts by weight of a propylene glycol fatty acid ester and 0.4–5 parts by weight of a sorbitan fatty acid ester to a temperature above 60° C. to obtain a homogeneous solution (first phase), (b) Heating a mixture of 0.5–10 parts by weight of a sucrose fatty acid ester and 0.5–10 parts by weight of one or more members selected from the group consisting of ethyl alcohol, propylene glycol and glycerol to obtain a second homogeneous solution (second phase), and (c) Dissolving the first phase into the second phase, stirring the thus obtained solution together with a third phase comprising 40–70 parts by weight of one or more members selected from the group consisting of aqueous sorbitol solution (30–70 percent aqueous sorbitol solution), aqueous invert sugar solution, corn syrup and honey to obtain a homogeneous emulsion and then quickly cooling and kneading or milling the emulsion, or (d) As an alternative to step (c), dissolving the second phase in the third phase, stirring the thus obtained solution together with the first phase to obtain a homogeneous emulsion and quickly cooling and kneading or milling the same.

The cooling followed by kneading is preferably effected as quickly as possible. If the cooling is not quickly effected, the resulting emulsified fat has poor stability. For quick cooling and kneading, a cooling device such as Votator or Perfector is employed.

The basic composition of the emulsified fat composition prepared by the process of the present invention comprises 20–45 parts by weight of an edible oil or fat and a total of 80–55 parts by weight of an emulsifier and an aqueous sorbitol solution, invert sugar solution or the like, to make a total of 100 parts by weight. For obtaining an excellent emulsion stability, the total quantity of oil or fat and the emulsifier must be less than 60 percent by weight, based on the total weight of the emulsified fat composition.

It is said that, in general, the taste of a cake becomes better as the edible oil or fat content becomes larger in quantity and the emulsifier contained in the emulsified fat composition becomes smaller in quantity. However, according to the present invention, a satisfactory taste can be obtained, even if the edible oil or fat is present in a small quantity, provided that an aqueous sorbitol solution, invert sugar solution, corn syrup and/or honey also is present.

The use of lecithin, a glycerol fatty acid ester, a sorbitan fatty acid ester and a sucrose fatty acid ester is indispensable, because they have the effect of assuring uniform texture of cakes. A glycerol fatty acid ester, a propylene glycol fatty acid ester and a sucrose fatty acid ester are effective for enhancing the foaming or expansion property of the cake recipe. Ethyl alcohol, propylene glycol and glycerol are used for increasing the dispersibility and solubility of the sucrose fatty acid ester. Propylene glycol also has a fungicidal action. Polyglycerol fatty acid esters such as decaglycerol monostearate or polyoxyethylene sorbitan fatty acid esters such as Tween 60 can be used instead of sucrose fatty acid esters.

The edible oils and fats used in the present invention are those ranging from edible liquid oils of both animal and vegetable origins to natural solid fats and hardened oils of melting points up to about 35° C. The most suitable oils and fats are cotton seed oil, corn oil and soybean oil having an iodine value above 70.

The fatty acid moieties of the glycerol fatty acid esters, propylene glycol fatty acid esters, sorbitan fatty acid esters and sucrose fatty acid esters are saturated or unsaturated fatty acids having 14–22 carbon atoms. Generally, saturated fatty acids are used. Either a pure fatty acid or a mixed fatty acid can be used.

Glycerol fatty acid esters used in the present invention are glycerol mono- or di-fatty acid esters. As sucrose fatty acid esters, there are used sucrose mono- or di-fatty acid esters or mixtures of them.

As described above, the process of the present invention comprises mixing the components in a specially fixed proportion in a specific sequence and quickly cooling and kneading the mixture in the final stage. The effect of the present invention cannot be obtained if any of the above conditions is omitted.

The emulsified fats produced according to the present invention are free from the defects of conventional emulsified fats in the preparation of cakes such as poor foaming property, smallness in volume and hardness of baked sponge cakes and easy molding of the emulsified fats.

EXAMPLE 1

Into a large-sized, 1500 kg. volume tank provided with a propeller stirrer, there were charged 200 kg. of soybean oil of an iodine value of 90, 2 kg. of soybean lecithin, 31 kg. of glycerol fatty acid monoester, 30 kg. of propylene glycol monostearate and 5 kg. of sorbitan fatty acid ester. The mixture was heated to a temperature above 60° C. to obtain a first phase (homogeneous solution).

Separately, 10 kg. of sucrose fatty acid ester (HLB 15), 5 kg. of ethyl alcohol and 5 kg. of glycerol were charged into a stainless steel tank (capacity: 1 ton). The mixture was heated to a temperature of 60–70° C. to obtain a solution (second phase). Then to the resulting second phase was added a third phase, i.e. 700 kg. of 70 percent aqueous sorbitol solution, and the same was thoroughly stirred to obtain a uniform mixed solution of the second and the third phases.

Finally, the mixed solution of the second and the third phases was added in the large-sized tank containing the first phase and the contents were emulsified at a temperature of 60–65° C. for about one hour. After the completion of emulsification, the emulsion was quickly cooled and kneaded with a Perfector (a product of Gerstenberg & Agger Co.; capacity 1000 kg./hr.) to obtain a pasty emulsified fat having a good emulsion stability.

EXAMPLE 2

Into a large-sized, 1500 kg. volume tank provided with a propeller stirrer which tank is the same as the tank in Example 1, there were charged 350 kg. of cotton seed oil of an iodine value 90, 7 kg. of soybean lecithin, 30 kg. of glycerol fatty acid monoester, 60 kg. of propylene glycol monostearate and 13 kg. of sorbitan fatty acid ester. The mixture was heated to a temperature above 60° C. to obtain a first phase.

Separately, 30 kg. of sucrose fatty acid ester, 10 kg. of ethyl alcohol and 10 kg. of propylene glycol were charged in a stainless steel tank (capacity: 1 ton). The mixture was heated to a temperature of 60–70° C. to obtain a solution (second phase). Thus, the resulting second phase was added to the first phase in said tank and the whole was emulsified at a temperature of 60–65° C. for about 20 minutes to obtain a homogeneous emulsion. Then, a separately prepared third phase, i.e., a solution comprising 250 kg. of 70 percent aqueous sorbitol solution and 240 kg. of invert sugar solution, was added to the mixed system of the first and the second phases in the tank. The contents were stirred with heating to a temperature of 60–70° C. for about 40 minutes to obtain an emulsion. After the completion of emulsification, the emulsion was quickly cooled and kneaded with a Perfector to obtain a pasty emulsified fat having a good emulsion stability.

EXAMPLE 3

Sample I (a product of the present invention), Samples II, III and IV (control products for the purposes of comparison) were prepared in the same manner and under the same operating conditions as in Example 1 from the ingredients listed in the following table and using the cooling means listed in the table.

| Ingredient, parts by weight: | Sample I | Comparative sample II | Comparative sample III | Comparative sample IV |
|---|---|---|---|---|
| Oil (soybean oil of iodine value 90) | 35.0 | 30.0 | 10.0 | |
| Lecithin | 0.7 | | 0.7 | 5.0 |
| Glycerol fatty acid ester | 3.0 | 5.3 | 3.0 | 7.0 |
| Propylene glycol fatty acid ester | 6.0 | 6.0 | 6.0 | |
| Sorbitan fatty acid ester | 1.3 | 1.3 | 1.3 | 7.0 |
| Sucrose fatty acid ester | 3.0 | 3.0 | 3.0 | 8.0 |
| Ethyl alcohol | 1.0 | | | 1.0 |
| Propylene glycol | 1.0 | | | 1.0 |
| 70% aqueous sorbitol solution | 49.0 | | 41.4 | 45.0 |
| Water | | 34.4 | 34.4 | 16.0 |
| Cooling means | (¹) | Allowed to cool at room temperature | | |
| Appearance of emulsified fat (room temperature) | Paste | (²) | Paste | Paste |

¹ Quickly cooled and kneaded with Perfector.
² Poor emulsification (oil phase separated).

Then, sponge cakes were prepared from the thus obtained Samples I, II, III and IV. Twenty (20) grams of Samples I, II, III and IV, respectively, were added to separate cake-making compositions, each comprising 120 g. of eggs, 100 g. of sugar, 100 g. of flour (soft), 1 g. of baking powder and 30 g. of water.

Sample IV containing no oil or fat was used in a quantity of 10 g. Sample IV was mixed with 10 g. of commercial margarine and was treated in the same manner as above.

Cakes were made using the respective samples by introducing the eggs, flour, sugar, baking powder, water and samples simultaneously into a 10-quart Hobart mixer and mixed to obtain a batter. The batter thus obtained was placed in a layer cake pan of a diameter of 16.5 cm. and baked at 180° C. to obtain a cake.

The batter specific gravity (g./cc.) was measured first for determining the foaming property of the cake and then the specific volume (cc./g.) was measured for determining the degree of raising. The taste, color of baked cake, mold-proof property and aging according to a baker's compressimeter were also tested. The results were as listed in the following table.

| Item | Sample I | Comparative sample II | Comparative sample III | Comparative sample IV |
|---|---|---|---|---|
| Batter specific gravity (g./cc.) | 0.38 | 0.63 | 0.59 | 0.56 |
| Cake specific volume (cc./g.) | 4.8 | 3.7 | 3.8 | 4.0 |
| Taste | Good | (¹) | (²) | (²) |
| Color of baked cake | Good | (¹) | (²) | (²) |
| Mold-proof property (after storage at 30° C. for 5 days) | (³) | Mold | Mold | Mold |
| Aging (g./mm.²):[4] | | | | |
| After one day | 0.04 | 0.08 | 0.09 | 0.06 |
| After 5 days | 0.06 | 0.11 | 0.13 | 0.08 |

¹ Not quite good.
² Inferior.
³ No mold.
[4] The smaller the aging value is, the more excellent is the cake's aging resistance (g./mm.²). That is, the smaller the aging value is, the softer is the cake.

We claim:

1. A process for producing emulsified fats, comprising the steps of (a) heating a mixture of 20–45 parts by weight of an edible oil or fat, 0.1–1 part by weight of lecithin, 2–10 parts by weight of glycerol fatty acid ester, 2–10 parts by weight of propylene glycol fatty acid ester and 0.4–5 parts by weight of sorbitan fatty acid ester to obtain a homogeneous solution constituting a first phase, (b) heating a mixture of 0.5–10 parts by weight of a material selected from the group consisting of sucrose fatty acid ester, polyglycerol fatty acid ester and polyoxyethylene sorbitan fatty acid ester and mixtures thereof, and 0.5–10 parts by weight of one or more members selected from the group consisting of ethyl alcohol, propylene glycol and glycerol to obtain a solution constituting a second phase, and (c) dissolving the first phase into the second phase, stirring the thus obtained solution together with a third phase comprising 40–70 parts by weight of one or more members selected from the group consisting of a 30–70 percent aqueous sorbitol solution, an invert sugar solution, corn syrup and honey to obtain a homogeneous emulsion, and then quickly cooling and kneading the emulsion.

2. A process for producing emulsified fats, comprising the steps of (a) heating a mixture of 20–45 parts by weight of an edible oil or fat, 0.1–1 part by weight of lecithin, 2–10 parts by weight of glycerol fatty acid ester, 2–10 parts by weight of propylene glycol fatty acid ester and 0.4–5 parts by weight of sorbitan fatty acid ester to obtain a homogeneous solution constituting a first phase, (b) heating a mixture of 0.5–10 parts by weight of a material selected from the group consisting of sucrose fatty acid ester, polyglycerol fatty acid ester and polyoxyethylene sorbitan fatty acid ester and mixtures thereof, and 0.5–10 parts by weight of one or more members selected from the group consisting of ethyl alcohol, propylene glycol and glycerol to obtain a solution constituting a second phase, and (c) dissolving the second phase in a third phase comprising 40–70 parts by weight of one or more members selected from the group consisting of a 30–70 percent aqueous sorbitol solution, an invert sugar solution, corn syrup and honey, stirring the thus obtained solution together with the first phase to obtain a homogeneous emulsion and quickly cooling and kneading the emulsion.

3. A process according to claim 1, in which said edible oil or fat is selected from the group consisting of edible liquid oils of animal and vegetable origin, solid fats and hardened oils having melting points of up to about 35° C. and mixtures thereof.

4. A process according to claim 1, in which the fatty acid moieties of said esters are saturated fatty acids having from 14 to 22 carbon atoms.

5. An emulsified fat composition prepared by the process of claim 2.

6. A process according to claim 2, in which said edible oil or fat is selected from the group consisting of edible liquid oils of animal and vegetable origin, solid fats and hardened oils having melting points of up to about 35° C. and mixtures thereof.

7. A process according to claim 2, in which the fatty acid moieties of said esters are saturated fatty acids having from 14 to 22 carbon atoms.

References Cited

UNITED STATES PATENTS

| | | | |
|---|---|---|---|
| 3,006,771 | 10/1961 | Babayan et al. | 99—118 R |
| 3,158,487 | 11/1964 | Reid | 99—118 R |
| 3,230,090 | 1/1966 | Weiss | 99—118 R |
| 3,479,189 | 11/1969 | Vrang et al. | 99—118 R |

RAYMOND N. JONES, Primary Examiner